(12) United States Patent
Dziewit

(10) Patent No.: US 12,311,827 B2
(45) Date of Patent: May 27, 2025

(54) TONNEAU RAIL SYSTEM AND ATTACHMENT DEVICE FOR SECURING A TONNEAU RAIL TO A VEHICLE

(71) Applicant: Extang Corporation, Ann Arbor, MI (US)

(72) Inventor: Jack H. Dziewit, New Hudson, MI (US)

(73) Assignee: Extang Corporation, Ann Arbor, MI (US)

( * ) Notice: Subject to any disclaimer, the term of this patent is extended or adjusted under 35 U.S.C. 154(b) by 831 days.

(21) Appl. No.: 17/528,259

(22) Filed: Nov. 17, 2021

(65) Prior Publication Data

US 2022/0297590 A1    Sep. 22, 2022

Related U.S. Application Data

(60) Provisional application No. 63/162,618, filed on Mar. 18, 2021.

(51) Int. Cl.
*B60P 7/00* (2006.01)
*B60J 7/14* (2006.01)
*B60P 7/08* (2006.01)

(52) U.S. Cl.
CPC ............. *B60P 7/0815* (2013.01); *B60J 7/141* (2013.01)

(58) Field of Classification Search
CPC ................................. B60P 7/0815; B60J 7/141
See application file for complete search history.

(56) References Cited

U.S. PATENT DOCUMENTS

| | | | |
|---|---|---|---|
| 4,850,769 A | 7/1989 | Matthews | |
| 4,969,784 A * | 11/1990 | Yanke | B61D 45/001 410/104 |
| 5,882,058 A | 3/1999 | Karrer | |
| 6,024,402 A | 2/2000 | Wheatly | |
| 6,264,266 B1 | 7/2001 | Rusu et al. | |
| 6,547,311 B1 * | 4/2003 | Derecktor | B60P 7/0815 296/100.18 |
| 7,014,400 B1 * | 3/2006 | LaBelle | B60P 7/0815 410/104 |
| 9,975,501 B1 | 5/2018 | Frederick et al. | |
| 11,014,617 B2 | 5/2021 | Meingast et al. | |
| 2005/0040670 A1 | 2/2005 | Kikuchi et al. | |
| 2007/0110539 A1 | 5/2007 | Klinkman et al. | |
| 2008/0231075 A1 | 9/2008 | Plavetich | |
| 2019/0126994 A1 | 5/2019 | Brown | |
| 2023/0010766 A1 * | 1/2023 | King | B60P 7/0815 |

FOREIGN PATENT DOCUMENTS

WO    2021/042025 A1    3/2021

OTHER PUBLICATIONS

Canadian Office Action dated Mar. 22, 2023, for application 3,146,761.

\* cited by examiner

*Primary Examiner* — Steven O Douglas

(57) ABSTRACT

A tonneau rail system that includes a tonneau rail and an attachment device that is configured to secure the tonneau rail to an accessory rail that is secured to a bed wall of a cargo area of a vehicle. The accessory rail includes a channel that extends along a length of the bed wall; and the attachment device comprises an anchor, a clamp member, and a fastener that engages the anchor and the clamp member to secure the anchor and the clamp member to the channel of the accessory rail. The clamp member is configured to clamp or press the tonneau rail directly or indirectly against the bed wall.

19 Claims, 3 Drawing Sheets

TONNEAU RAIL SYSTEM AND ATTACHMENT DEVICE FOR SECURING A TONNEAU RAIL TO A VEHICLE

PRIORITY

This application claims the benefit of U.S. 63/162,618 filed on Mar. 18, 2021, the entirety of which is hereby incorporated by reference herein for all purposes.

FIELD

These teachings relate to vehicle tonneau cover systems, and more particularly to a tonneau rail system and attachment device for securing a tonneau rail to a vehicle.

BACKGROUND

Some vehicles like pick-up trucks, have an open-topped bed or cargo area that may be used for storing and/or transporting cargo. A cover, such as a tonneau cover, may be placed over the cargo area to conceal the cargo from view and/or to prevent fluid and/or debris from entering the cargo area. The cover may be moved or opened to access the cargo and/or the cargo area.

The bed or cargo area of the vehicle may be defined by one or more bed walls. One or more tonneau rails may be attached to the one or more of the bed walls to support the tonneau cover. Typically, the one or more tonneau rails may be attached to one or more of the bed walls with one or more attachment devices, such as clips, latches, and/or clamps. While many of these known attachment devices are suitable for their intended purpose, attaching some tonneau rails to the bed wall of a vehicle may be cumbersome, complicated, and time consuming. Accordingly, improvements in the art may be desired for certain applications.

For example, some cargo areas have one or more accessory rails, for attaching one or more accessories to the vehicle or bed wall, such as tie-down cleats, cargo dividers, bicycle racks, and the like. An example of such is disclosed in U.S. Pat. No. 6,024,402 and in U.S. Pat. No. 11,014,617 B2, both of which are incorporated by reference herein for all purposes. It may be desirable to have an attachment device for quickly and easily securing a tonneau rail to the accessory rail. It may be desirable to have an attachment device for quickly and easily securing an accessory to the accessory rail.

SUMMARY

These teachings provide a tonneau rail system. The tonneau rail system may comprise one or more attachment devices, which may include one or more anchors and one or more clamp members. The tonneau rail system may comprise one or more tonneau rails.

These teachings provide an attachment device for quickly and easily securing an accessory and/or a tonneau rail to the accessory rail of a vehicle.

These teachings provide a tonneau rail system comprising a tonneau rail and an attachment device that is configured to secure the tonneau rail to an accessory rail that is secured to a bed wall of a cargo area of a vehicle, wherein the accessory rail comprises a channel that extends along a length of the bed wall, wherein the attachment device comprises an anchor, a clamp member, and a fastener that engages the anchor and the clamp member to secure the anchor and the clamp member to the channel of the accessory rail.

These teachings also provide an attachment device configured to secure an accessory to an accessory rail that is secured to a bed wall of a cargo area of a vehicle, wherein the accessory rail comprises a channel that extends along a length of the bed wall, wherein the attachment device comprises an anchor, a clamp member, and a fastener that engages the anchor and the clamp member to secure the anchor and the clamp member to the accessory rail.

DETAILED DESCRIPTION

Figure 1:
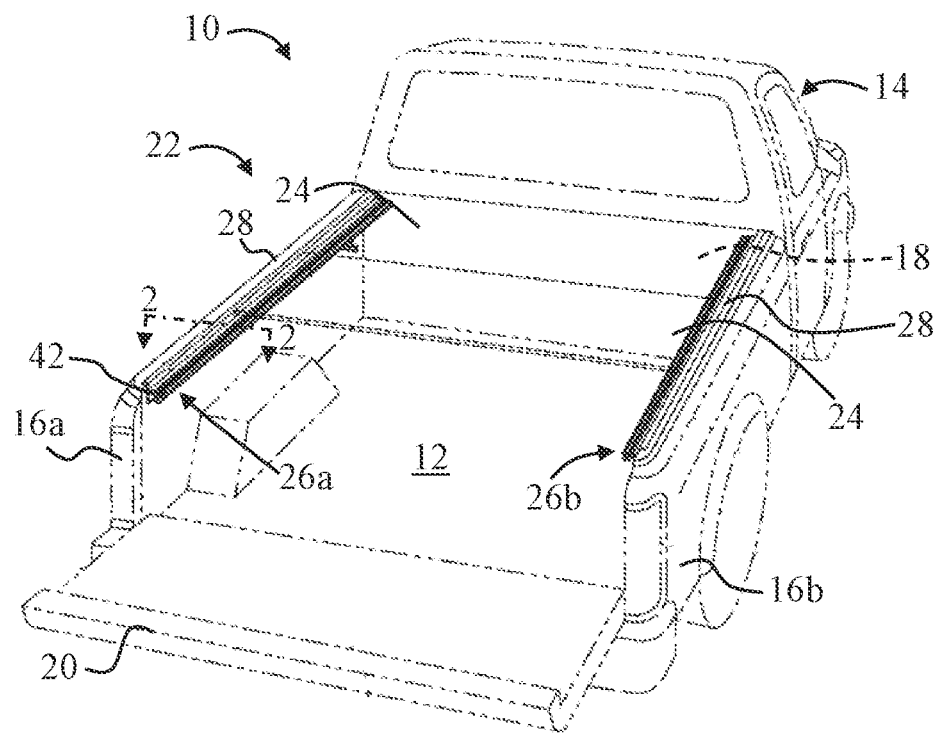
FIG. 1 is a perspective view of a vehicle comprising a cargo area defined by bed walls.

FIG. 1 illustrates a vehicle 10. The vehicle 10 comprises a bed or cargo area 12 and a passenger cab 14. The cargo area 12 may be defined by or may comprise one or more bed walls that may include: opposing side bed walls 16a, 16b, a front bed wall 18 that is located adjacent to the passenger cab 14, and a rear bed wall or tailgate 20.

A tonneau cover 22 may be placed over the bed or cargo area 12. The tonneau cover 22 may include one or more panels 24. While two panels 24 are illustrated in FIG. 1, the tonneau cover 22 may have any number of panels (i.e., one or more panels). The tonneau cover 22 may be attached or supported on one or more tonneau rails, which may be secured or attached to the one or more of the bed walls 16a,16b,18,20 defining the cargo area 12. For example, the tonneau cover 22 may be supported on first and second tonneau rails 26a, 26b that are attached to the two opposing side bed walls 16a, 16b. The first and/or second tonneau rails 26a, 26b may be secured or attached to one or more accessory rails 32 illustrated in the following figures.

While the description in the following figures and paragraphs focuses on the tonneau rail 26a and the bed wall 16a, it is understood that the teachings can be applied to attaching a tonneau rail to any bed wall, including the other side wall 16b, the front wall 18, and/or the tailgate 20. The tonneau rail and/or attachment device attached to any of the bed walls may be a mirror image of what is shown and disclosed herein.

Figure 2:
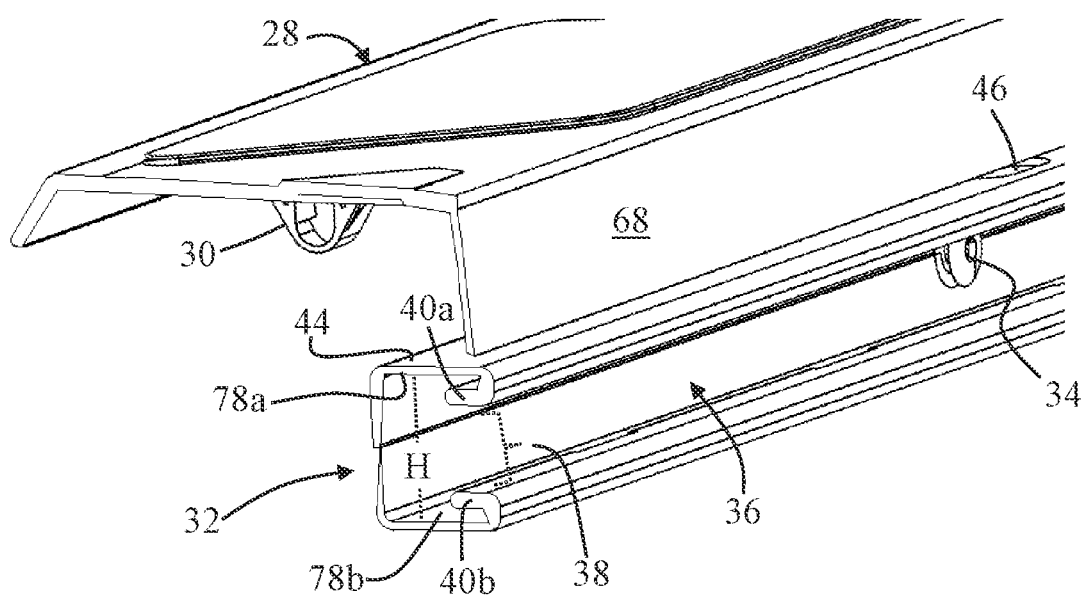
FIG. 2 is a cross-sectional view of a bed cap and accessory rail taken along line 2-2 in FIG. 1.

With additional reference to FIG. 2, the bed wall 16a may include an optional bed cap 28. The bed cap 28 may be a structure that is provided over or on top of a top surface of the bed wall 16a (and/or on an inside and/or outside wall of the bed wall 16a). The bed cap 28 may be secured to the top surface of the bed wall 16a with one or more fasteners, such as one or more clips 30. However, in certain configurations, the bed cap 28 may be omitted. For example, lower end vehicles 10 having fewer options may be free of a bed cap 28, while higher end vehicles 10 having many options may include a bed cap 28 to improve styling and aesthetics.

One or more accessory rails 32 may be attached to the bed wall 16a and/or to the bed cap 28. The accessory rail 32 may be attached or secured to the bed wall 16a and/or bed cap 28 via one or more fasteners 34. The accessory rail 32 may be installed by the vehicle OEM or as an aftermarket component by a vehicle owner. The accessory rail 32 may be located on an inside surface of the side wall 16a facing the inside of the cargo area 12. The accessory rail 32 may be secured to the top surface of the bed wall 16a (surface facing up, which may include one or more stake holes), the inside surface of the bed wall 16a (surface facing inside the cargo area 12), or the outside surface of the bed wall 16a (surface facing outside of the cargo area 12). The accessory rail 32 may extend along an entire length of the bed wall 16a, between the front wall 18 and the tailgate 20 (FIG. 1) or only along a portion of that length. More than one accessory rail 32 may be installed on the side wall 16a. For example, two or more accessory rails 32 may be installed on the side wall 16a end-to-end to have a single elongated accessory rail 32 extended along a length of the side wall 16a. For example, two or more accessory rails 32 may be installed on the side wall on top of one another such that the two or more accessory rails 32 are generally parallel to one another. In other configurations, the one or more accessory rails 32 may be installed in a generally vertical orientation, such that the channels 36 extend generally perpendicular to what is illustrated and described in these figures.

The accessory rail 32 may have one or more elongated channels 36. The surface or side of the accessory rail 32 that faces the inside of the cargo area 12 may have an opening 38. The opening 38 may be defined between two inwardly projecting tabs or fingers 40a, 40b. Access into the channel 36 may be provided through this opening 38. The opening 38 may be defined along an entire length of the channel 36. Alternatively, the opening 38 may be intermediately defined along the length of the channel 36 and the accessory rail 32 may be regions where there are no openings (i.e., the surface or side of the accessory rail 32 that faces the inside of the cargo area 12 may have one or more discrete openings 38 vs. an elongated opening 38 as illustrated in the figures).

The accessory rail 32 may have an end cap 42 at one or both of the longitudinal ends of the channel 36. The end cap 42 may be removed to provide access into the channel 36 from the ends thereof. Alternatively, the accessory rail 32 may be free of a cap 42 and access into the channel 36 may be provided though the open ends of the channel 36 at the front and rear ends thereof. The accessory rail 32 may have a top surface 44 that includes one or more openings 46 that may provide access into the channel 36. The channel 36 may have a C or U-shaped cross section; however, other cross-sections may be envisioned, such as a T-shaped or mushroom shaped slot. The channel 36 may also have opposing upper and lower surfaces 78a, 78b.

One or more accessories may be secured or attached to the accessory rail 32 or channel 36. The one or more accessories may include one or more cleats, tie downs, cargo dividers, attachment devices 48, tonneau rails 26a, etc. The one or more accessories may be secured to the accessory rail 32 or channel 36 and thus to the side wall 16a of the vehicle. The one or more accessories may be configured to secure various cargo to the vehicle or cargo area and/or provide a mounting point for securing cargo via one or more chains, straps, ropes, etc.

Figure 3:
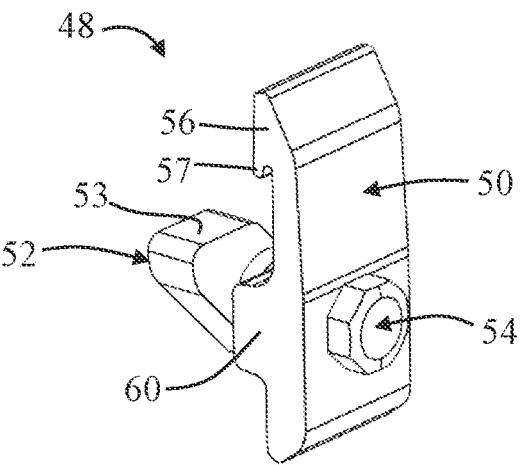
FIG. 3 is a perspective view of an attachment device.
Figure 4:
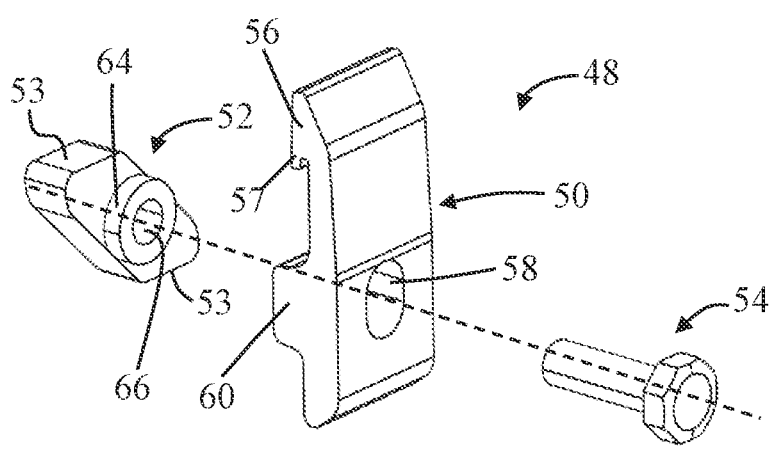
FIG. 4 is an exploded perspective view of the attachment device.
Figure 5:
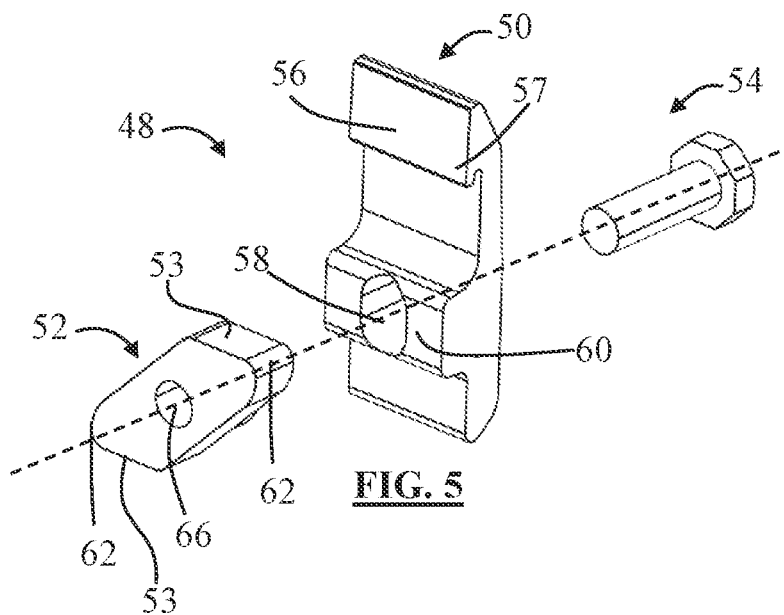
FIG. 5 is an exploded perspective view of the attachment device.

FIGS. 3-5 illustrate an attachment device 48 for engaging the accessory rail 32 or channel 36. The attachment device 48 comprises a clamp member 50, an anchor 52, and a fastener 54. The attachment device 48 may be configured to attach or secure one or more accessories to the accessory rail 32.

Figure 7:
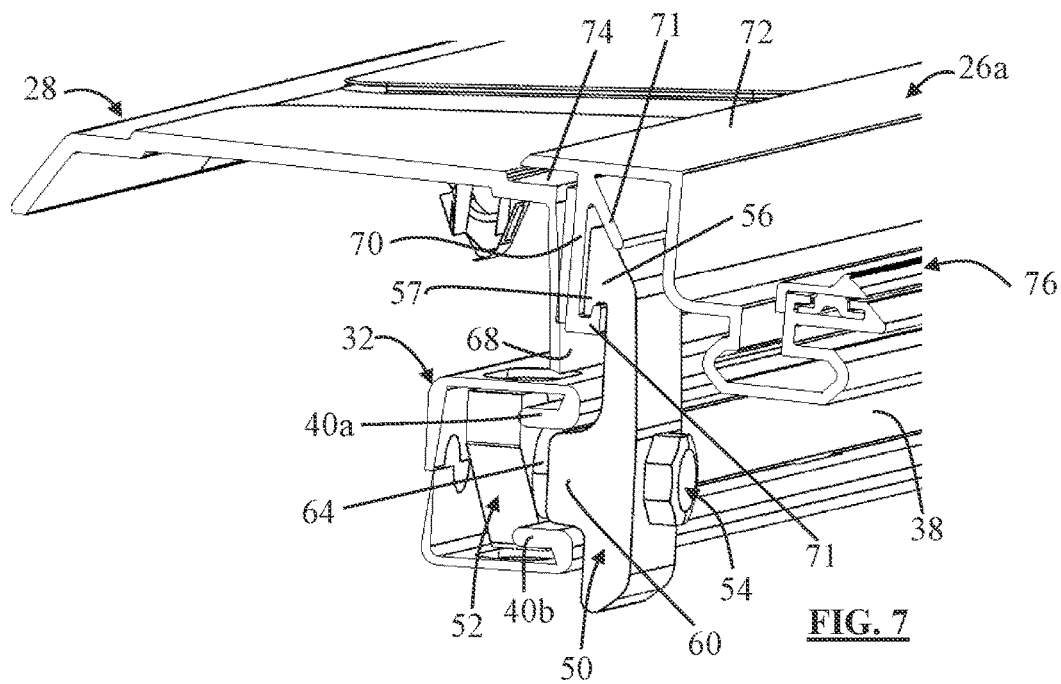
FIG. 7 is a perspective, cross-sectional view of a tonneau rail system.

The clamp member 50 comprises an attaching member 56 for engaging the accessory or tonneau rail 26a (See FIG. 7). The attaching member 56 comprises a finger or hook 57 for engaging a corresponding, finger or hook 71 on the engagement portion 70 of the of the tonneau rail 26a (FIG. 7). The finger 57 of the attaching member 56 may be downwardly facing, in vehicle position. The clamp member 50 comprises one or more bores or apertures 58 for receiving or engaging one or more fasteners 54. The bore or aperture(s) 58 may be threaded. The bore or aperture(s) 58 may be smooth or non-threaded. The clamp member 50 comprises an engagement feature 60 sized, shaped, and configured to fit within the opening 38 defined in the accessory rail 32 and engage the channel 36. The engagement feature 60 may be a flange, boss, hub, or other projection.

The anchor 52 is sized, shaped, and configured to fit within the channel 36. The anchor 52 has a width designed to fit or slide within a height H of the channel 36, that may be defined between the two opposing surfaces 78a, 78b (FIG. 2). The anchor 52 has a height that is defined between two opposing ends 62 that is larger or longer than the height H of the channel 36. The anchor 52 has a projection, hub, flange or boss 64 for engaging the opening 38 defined in the accessory rail 32. The anchor 52 has a bore 66 for receiving or engaging the fastener 54.

The anchor 52 has one or more angled walls 53. Two or more of the angled walls 53 may be generally parallel to one another. The one or more angled walls 53 may function to provide a wedge effect to jam, secure, or lock the anchor 52 within the channel 36 and between the two opposing surfaces 78a, 78b, discussed further below with reference to FIGS. 6-7.

The fastener 54 may engage the bores 58, 66 such that by tightening the fastener 54, the clamp member 50 and the anchor 52 are brought closer together. By loosening the fastener 54, the clamp member 50 and the anchor 52 can be separated or moved apart. The fastener 54 may be a threaded member or bolt that threadably engages threads defined in the bores 58,66. The fastener 54 may be any fastener and tightened by hand or via a tool, such as a screw driver. The fastener 54 may be a quick connect or quarter-turn fastener. The fastener may have a flat, star, or torx head. The fastener may be a push fastener, Christmas tree, rivet. The fastener may be a Torx button head holt, a Torx 30 Button head bolt, a hex head bolt, or the like.

Figure 6:
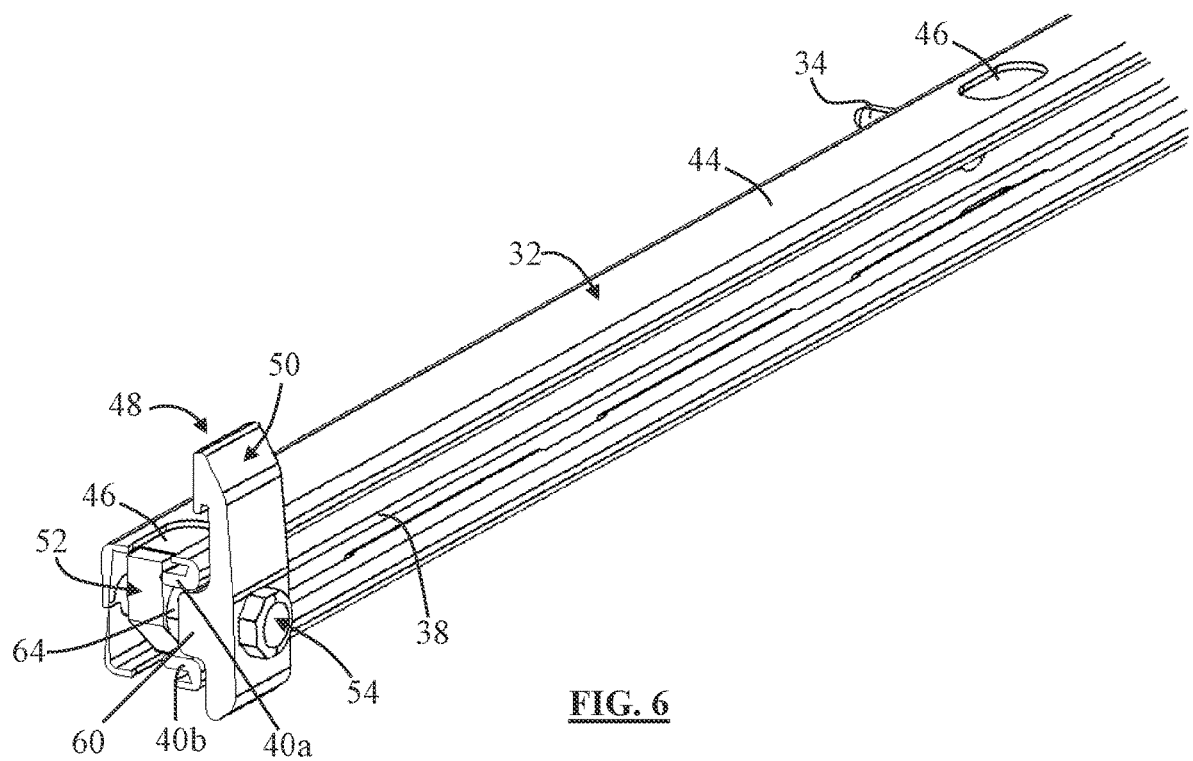
FIG. 6 is a perspective, cross-sectional view of the attachment device engaging the accessory rail.

FIG. 6 illustrates the attachment device 48 attached or secured to the accessory rail 32. The optional bed cap 28 illustrated FIGS. 2 and 7 has been removed for clarity. The accessory rail 32 may be secured to the bed wall 16a of the vehicle 10 via one or more fasteners 34 (See also FIG. 2)

The anchor 52 may be installed inside of the channel 36 by manipulating, sliding, or passing the anchor 52 through the opening 38 in the accessory rail 32; by manipulating, sliding, or passing the anchor 52 through the opening defined at the front or rear end of the accessory rail 32 (i.e., by removing the optional end cap 42; FIG. 1); and/or by manipulating, sliding, dropping, or passing the anchor 52 through one or more of the openings 46 defined in the top surface 44 of the accessory rail 32.

The flange 64 of the anchor 52 may fit or engage the opening 38 of the accessory rail 32, from the inside of the channel 36 to locate and align the anchor 52 within the channel 36. In other words, the flange 64 may fit in the opening 38 defined between the two opposing tabs or fingers 40a, 40b (FIG. 2) from inside the channel 36.

The clamp member 50 may be brought into engagement with the accessory rail 32 by fitting the engagement feature 60 of the clamp member 50 into the open portion 38 of the accessory rail 32 from the outside of the channel 36. The engagement feature 60 may fit in the opening 38 between the two opposing tabs or fingers 40a, 40b (See also FIG. 2) from outside the channel 36. This placement of the anchor 52 and clamp member 50 relative to the opening 38 may generally align the corresponding bores 58, 66 of the clamp member 50 and the anchor 52 along a common axis to allow the fastener 54 to engage the bores 58, 66 to connect together the clamp member 50 and anchor 52. Tightening the fastener 54 (for example, by turning the fastener and/or moving the fastener in or out of the bores 58, 66) by may cause the clamp member 50 and anchor 52 to move towards each other and sandwich or clamp the accessory rail 32 or tabs or fingers 40a, 40b therebetween. Tightening the fastener 54 may also cause the anchor 52 to partially rotate or turn within the channel 36 such that the angled walls 53 and/or ends 62 of the anchor 52 contact or engage the upper and lower surfaces 78a, 78b defining of the channel 36 (See FIG. 2). This will cause the anchor 52 to wedge itself within the channel 36 and thus restrict or prevent the anchor 52 from further rotation and/or sliding or translation along a length of the channel 36 or otherwise moving in the channel 36. For example, the anchor 52 may rotate or turn 5 degrees or more 15 degrees or more within the channel 36, 25 degrees or more within the channel 36, 35 degrees or more within the channel 36, 45 degrees or more within the channel 36, 60 degrees or more within the channel 36, 75 degrees or more within the channel 36, or up to 90 degrees within the channel 36 to wedge itself in the channel 36 and then prevent movement thereof.

Turning now to FIG. 7, the tonneau rail 26a may then be brought into position between a face 68 of the bed cap 28 and the clamp member 50. Alternatively, if there is no bed cap 28, then the face 68 may be a side wall or face of the side wall or bed wall 16a defining the cargo bed 12. The tonneau rail 26a may have an engagement portion 70 that is configured to engage or surround the attaching member 56 or finger or hook 57 of the attaching member 56. The attaching member 56 engages the tonneau rail 26a in a location above the channel 36 of the accessory rail 32. The engagement portion 70 of the tonneau rail 26a may have one or two opposing fingers 71 (i.e., first finger and second finger) defining a U or C-shaped cross section into or between which the attaching member 56 or finger 57 thereof is configured to fit or be received in or between. For example, the bottom finger 71 (i.e., first finger) may be upwardly facing and the top finger 71 (i.e., second finger) may be downward facing. The attaching member 56 or the downwardly facing finger 57 of the attaching member 56 may engage the upwardly facing finger 71 (i.e., first finger) of the engagement portion 70 of the tonneau rail 26a.

The tonneau rail 26a may also have a top or engaging surface 72 that may contact or rest against a top surface 74 of the bed cap 28 or a top surface of the bed wall 16a if the bed cap 28 is omitted. The fastener 54 may then be further tightened, which will cause the anchor 52 and the clamping member 50 to further sandwich and apply tension onto the accessory rail 32 or fingers 40a, 40b. The attaching member 56 of the clamp member 50 will press or force or clamp the engagement portion 70 of the tonneau rail 26a against the face 68 of the bed cap 28 or the face 68 of the side wall of the bed wall. In other words, the clamp member 60 presses or clamps or applies a force onto the tonneau rail 26 so that the tonneau rail 26a is directly against the bed wall 16a or indirectly against the bed wall 16a (if the tonneau rail 26a is against the face 68 of the bed cap 28). The top or engaging surface 72 of the tonneau rail 26a may be pressed or clamped against the top surface 74 of the bed cap 28.

With the tonneau rail 26a now secured to the accessory rail 32 and thus to the side wall 16a of the vehicle 10, the tonneau cover 22 or panel(s) 24 thereof may be supported on the tonneau rail 26a. For example, the tonneau rail 26a may have a ledge or sealing surface 76 onto which one or more panels 24 of the tonneau cover 22 may contact or rest on.

To remove or separate the tonneau rail 26a from the accessory rail 32 or vehicle, the above steps may be performed in reverse order. For example, the fastener 54 may be loosened, which will reduce the tension or force applied onto the tonneau rail 26a via the clamp member 50. The tonneau rail 26a may then be separated from the accessory rail 32 or vehicle. The fastener 54 may then be re-tightened to prevent the elements of the attachment device 48 from rattling or coming apart. Alternatively, the fastener 54 may be removed from the bores 66, 58 of the anchor 52 and clamp member 50, thus allowing the fastener 54 and clamp member 50 to be separated from the accessory rail 32 or vehicle. The anchor 52 may remain in the channel 32, or the anchor 52 may be removed from the channel 32.

The vehicle may be any vehicle that has a cargo area or bed. The cargo area or bed may be any area or portion of the vehicle used for storing or transporting goods or cargo. The cargo area may be any part of the vehicle that has an open top. The open top can be at least partially closed or covered by a cover, which may be a trunk, decklid, tonneau cover, cap, tent, tarp, board, or a combination thereof. The cargo area may be a cargo box, a bed, a trunk, or a combination thereof. The cargo area may also be a trailer that is configured to be pulled or pushed by the vehicle.

The cargo area may be defined by one or more bed walls. The one or more bed walls may be a fender, side wall, front wall, a back wall or tailgate, or a combination thereof. The accessory rail may be attached to or engage one or more of the walls of the cargo area. The accessory rail may engage a top surface of the one or more bed walls, an inside surface of the one or more bed walls (i.e., a surface inside of the defined cargo area), an outside or exterior surface of the one or more bed walls (i.e., a surface outside of the defined cargo area).

The accessory rail may be a device or member that is attached to one or more of the bed walls (i.e., side walls, front wall, and/or tailgate). The accessory rail may be used to attached various accessories to the vehicle or cargo bed, such as tie down cleats, hooks, securing members, ladder racks, etc. The accessory rail may be supplied by the vehicle manufacturer. The accessory rail may be installed by the vehicle owner as an after-market accessory.

The accessory rail may include one or more channels. The channel may function to receive a portion of the attachment device, like the anchor and/or part of the clamp member. The channel may have a general C or U-shaped cross-section, such that one side is open to allow a portion of the clamp member to enter. The channel may include two or more fingers or tabs which may function to locate the anchor and clamp member within the locking channel and prevent vertical movement the anchor and clamp member.

The tonneau cover may be any cover or covering. The tonneau cover may function to protect against dirt, debris, fluid, and/or other contaminants from entering an inside of a cargo area. The tonneau cover may function to conceal the inside of the cargo area and/or contents inside the vehicle bed. The tonneau cover may comprise one or a plurality of panels. The one or more of the panels can be moved or repositioned relative to one another and/or relative to the cargo area to move the tonneau cover between an open configuration and a closed configuration. The open configuration is where one or all of the panels are moved to provide access to the cargo area. The closed configuration is where one or all of the panels at least partially cover the cargo area.

The one or more panels may be configured to be roll-up into a closed configuration and unrolled into the open configuration. The one or more panels may be configured to be folded-up into a closed configuration and then unfolded into the open configuration. In some configurations, the tonneau cover may be a single panel cover. The single panel can be raised or pivoted relative to the walls or top surfaces of the vehicle bed and/or tailgate to move the tonneau cover from the closed configuration to the open configuration, and then lowered or pivoted downwards to the closed configuration.

One or more of the panels may be rigid or substantially rigid. One or more of the panels may be flexible or substantially flexible but stabilized with a rigid frame. One or more of the panels may be plastic or metal slats. The tonneau cover may be a canvas, fabric, a folded, or roll-up type tonneau cover. In some configurations, the tonneau cover may also be a truck cap or tent or other cover that increases a height of a cargo area.

The tonneau rail system may include one or more tonneau rails. A tonneau rail comprises structure to attach or support the tonneau cover to the vehicle or vehicle bed or cargo area. The tonneau rail may function provide support for a tonneau cover to rest on when the tonneau cover or one or more panels are in the open or closed position. The tonneau rail may extend at least partially along a length of one or more of the bed walls or accessory rails. The tonneau rail may be an elongated component that is made of aluminum, metal, plastic, or a combination thereof The tonneau rail may have virtually any structure configured for supporting a tonneau cover in the open and/or closed position.

A tonneau rail system may include one or more of the following elements: tonneau cover, one or more panels, one or more tonneau rails, one or more accessory rails, one or more attachment devices.

The tonneau rail system may include one or more attachment devices. The one or more attachment devices may provide a mount or support or sufficient structure to support the tonneau rail and/or to attach or secure the tonneau rail to the bed wall or accessory rail. The attachment device may allow the tonneau rail to be attached or secured to the bed wall without drilling or adding additional holes through the tonneau rail, accessory rail, and/or bed wall. The attachment device may be used to support or attach one or more other accessories to the vehicle, accessory rail, or both. A plurality of attachment devices may be used to support a single tonneau rail to the accessory rail or bed wall.

The attachment device may include one or more clamp members. A clamp member may function to secure the one or more accessories to the accessory rail. The clamp member may be in contact with the accessory and the anchor. The clamp member may be made of any suitable material, such as plastic, metal, aluminum. The clamp member may secure the accessory above the accessory rail or channel of the accessory rail. The clamp member may secure the accessory below the accessory rail or channel of the accessory rail. The clamp member may be capable of slightly bending or deflecting to secure the accessory to the accessory rail or side wall.

The attachment device may include one or more anchors. The anchor may be made of plastic, steel, composite, or a combination thereof. The anchor may be square, rectangular, triangular, circular, trapezoidal, or any other suitable shape. The anchor may have one or more holes or bores for receiving one or more of the fasteners. The anchor may have one or more ends or surfaces. The one or more ends or surfaces may be curved, straight, or flat. The one or more ends may engage the channel to lock or wedge the anchor therein to prevent further moment of the anchor. The surface of the one or more ends may be smooth or textured to provide additional gripping inside of the channel.

The attachment device may include one or more fasteners. The fastener may function to attach the anchor and the clamp member to the bed wall or accessory anchor. The fastener may be made of plastic, metal, composite, or a combination thereof. The fastener may be threaded. The fastener may be smooth. The fastener may be a screw, a bolt, a pin, a rivet, a push fastener, a push pin, a nail, a weld, a projection, or another suitable fastener known in the art. The fastener may be self-tapping. Self-tapping means that the fastener is configured to cut or otherwise form a thread in the component or element into which hit is received or driven. The fastener may be expandable. The fastener may be configured to be reversible such that the fastener can be tightened and loosened to assemble and disassemble the system with damaging the tonneau rail, accessory rail, clamp member, etc. The fastener may be configured to be irreversible such that the fastener cannot be loosened after initially tightening the fastener without damaging the tonneau rail, accessory rail, clamp member, etc. The fastener may be tightened with a tool (i.e., screw driver, rachet, plyers, etc.). The fastener may have a Philips, flat, torx, start head. The fastener may be tightened by hand.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps. For example, disclosure of "a motor" does not limit the teachings to a single motor. Instead, for example, disclosure of "a motor" may include "one or more motors."

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention illustratively disclosed herein suitably may be practiced in the absence of any element which is not specifically disclosed herein.

Any of the elements, components, regions, layers and/or sections disclosed herein are not necessarily limited to a single embodiment. Instead, any of the elements, components, regions, layers and/or sections disclosed herein may be substituted, combined, and/or modified with any of the elements, components, regions, layers and/or sections disclosed herein to form one or more embodiments that may be not be specifically illustrated or described herein.

The disclosures of all articles and references, including patent applications and publications, testing specifications, are incorporated by reference for all purposes. Other combinations are also possible as will be gleaned from the following claims, which are also hereby incorporated by reference into this written description.

The invention claimed is:

1. A tonneau rail system comprising a tonneau rail and an attachment device that is configured to secure the tonneau rail to an accessory rail on a bed wall of a cargo area of a vehicle, the accessory rail comprises a channel that extends at least partially along a length of the bed wall, wherein the attachment device comprises an anchor, a clamp member, and a fastener that engages the anchor and the clamp member to secure the anchor and the clamp member to the channel of the accessory rail, and the clamp member is configured to clamp or press the tonneau rail directly or indirectly against the bed wall.

2. The tonneau rail system according to claim 1, wherein the clamp member comprises an attaching member that is configured to engage the tonneau rail in a location above the channel of the accessory rail.

3. The tonneau rail system according to claim 2, wherein the attaching member is configured to press the tonneau rail against a face of a bed cap or a face of the bed wall of the cargo area.

4. The tonneau rail system according to claim 3, wherein the attaching member is configured to engage a first finger of the tonneau rail.

5. The tonneau rail system according to claim 4, wherein the attaching member comprises a finger that is downwardly facing, and the first finger of the tonneau rail is upwardly facing.

6. The tonneau rail system according to claim 5, wherein the tonneau rail comprises a second finger that is downwardly facing, and the attaching member is received between the first finger and the second finger of the tonneau rail.

7. The tonneau rail system according to claim 3, wherein the anchor is configured to engage the accessory rail from inside the channel and the clamp member is configured to engage the accessory rail from outside the channel.

8. The tonneau rail system according to claim 7, wherein the clamp member comprises an engagement member that is configured to be received into an opening in the accessory rail that is defined between two opposing tabs of the accessory rail.

9. The tonneau rail system according to claim 7, wherein the anchor comprises a flange that is configured to be received into an opening in the accessory rail that is defined between two opposing tabs of the accessory rail.

10. The tonneau rail system according to claim 8, wherein the anchor comprises flange that is configured to be received into the opening of the accessory rail.

11. The tonneau rail system according to claim 1, wherein the anchor is configured to engage the accessory rail from inside the accessory rail and the clamp member is configured to engage the accessory rail from outside the accessory rail.

12. The tonneau rail system according to claim 11, wherein the clamp member comprises an engagement member that is configured to be received into an opening in the accessory rail that is defined between two opposing tabs of the accessory rail.

13. The tonneau rail system according to claim 11, wherein the anchor comprises a flange that is configured to be received into an opening in the accessory rail that is defined between two opposing tabs of the accessory rail.

14. The tonneau rail system according to claim 12, wherein the anchor comprises a flange that is configured to be received into an opening in the accessory rail that is defined between two opposing tabs of the accessory rail, and the attachment device is configured to press the tonneau rail against a face of a bed cap or a face of the bed wall of the cargo area.

15. The tonneau rail system according to claim 12, wherein the anchor comprises one or more angled walls for engaging opposing inside surfaces of the channel of the accessory rail.

16. An attachment device that is configured to secure an accessory to an accessory rail that is attached to a bed wall of a cargo area of a vehicle, wherein the accessory rail comprises a channel that extends at least partially along a length of the bed wall, wherein the attachment device comprises an anchor, a clamp member, and a fastener that engages the anchor and the clamp member to secure the anchor and the clamp member to the accessory rail, wherein the accessory is clamped or pressed directly or indirectly against the bed wall by the clamp member, wherein the clamp member comprises an attaching member that is configured to engage the accessory in a location above the channel of the accessory rail and press the accessory against a face of a bed cap or a face of the bed wall of the cargo area.

17. The attachment device according to claim 16, wherein the anchor is configured to engage the accessory rail from inside the accessory rail and the clamp member is configured to engage the accessory rail from outside the accessory rail.

18. The attachment device according to claim 16, wherein the clamp member comprises an engagement member that is configured to be received into an opening in the accessory rail that is defined between two opposing tabs of the accessory rail, and the anchor comprises a flange that is configured to be received into the opening in the accessory rail, and the attaching member is configured to press a tonneau rail against a face of a bed cap or a face of the bed wall of the cargo area.

19. An attachment device that is configured to secure an accessory to an accessory rail that is attached to a bed wall of a cargo area of a vehicle, wherein the accessory rail comprises a channel that extends at least partially along a length of the bed wall, wherein the attachment device comprises an anchor, a clamp member, and a fastener that engages the anchor and the clamp member to secure the anchor and the clamp member to the accessory rail, wherein the accessory is clamped or pressed directly or indirectly against the bed wall by the clamp member, wherein the anchor comprises one or more angled walls for engaging opposing inside surfaces of the channel of the accessory rail.

* * * * *